United States Patent [19]
Lin

[11] Patent Number: 5,653,574
[45] Date of Patent: Aug. 5, 1997

[54] APPARATUS FOR STACKING CORRUGATED BOARDS

[76] Inventor: Yung-Hua Lin, 10Fl., No. 227-2, Sec. 5, Lo-Szu-Fu Rd., Taipei, Taiwan

[21] Appl. No.: 540,755

[22] Filed: Oct. 11, 1995

[51] Int. Cl.$^6$ ............................................. B65G 57/00
[52] U.S. Cl. ............................ 414/791.5; 414/791.6; 414/792.8; 414/792.5
[58] Field of Search .................. 414/791.2, 791.5, 414/791.6, 791.8, 792.5, 792.8, 901, 923, 799

[56] References Cited

U.S. PATENT DOCUMENTS

| | | | |
|---|---|---|---|
| 2,828,871 | 4/1958 | Bardsley et al. | 414/791.8 |
| 3,770,144 | 11/1973 | DiFrank et al. | 414/791.2 |
| 3,997,154 | 12/1976 | Mol | 414/791.2 |
| 4,294,316 | 10/1981 | Hedley et al. | 414/791.6 |
| 4,478,403 | 10/1984 | Byrt | 414/791.2 |

*Primary Examiner*—Karen B. Merritt
*Assistant Examiner*—Gregory A. Morse
*Attorney, Agent, or Firm*—Bacon & Thomas

[57] ABSTRACT

An apparatus for stacking corrugated boards and permitting stacks of corrugated boards to be alternatively arranged together with one above another in a zigzag order. A carrier is mounted for collecting corrugated boards from the output end of the finished product conveyer of an automatic corrugated board fabrication system, a shifting mechanism is controlled to shift the carrier horizontally, a counter is controlled to count the number of pieces of the corrugated boards being stacked, and a suspension mechanism is controlled to lift or lower the carrier.

1 Claim, 5 Drawing Sheets

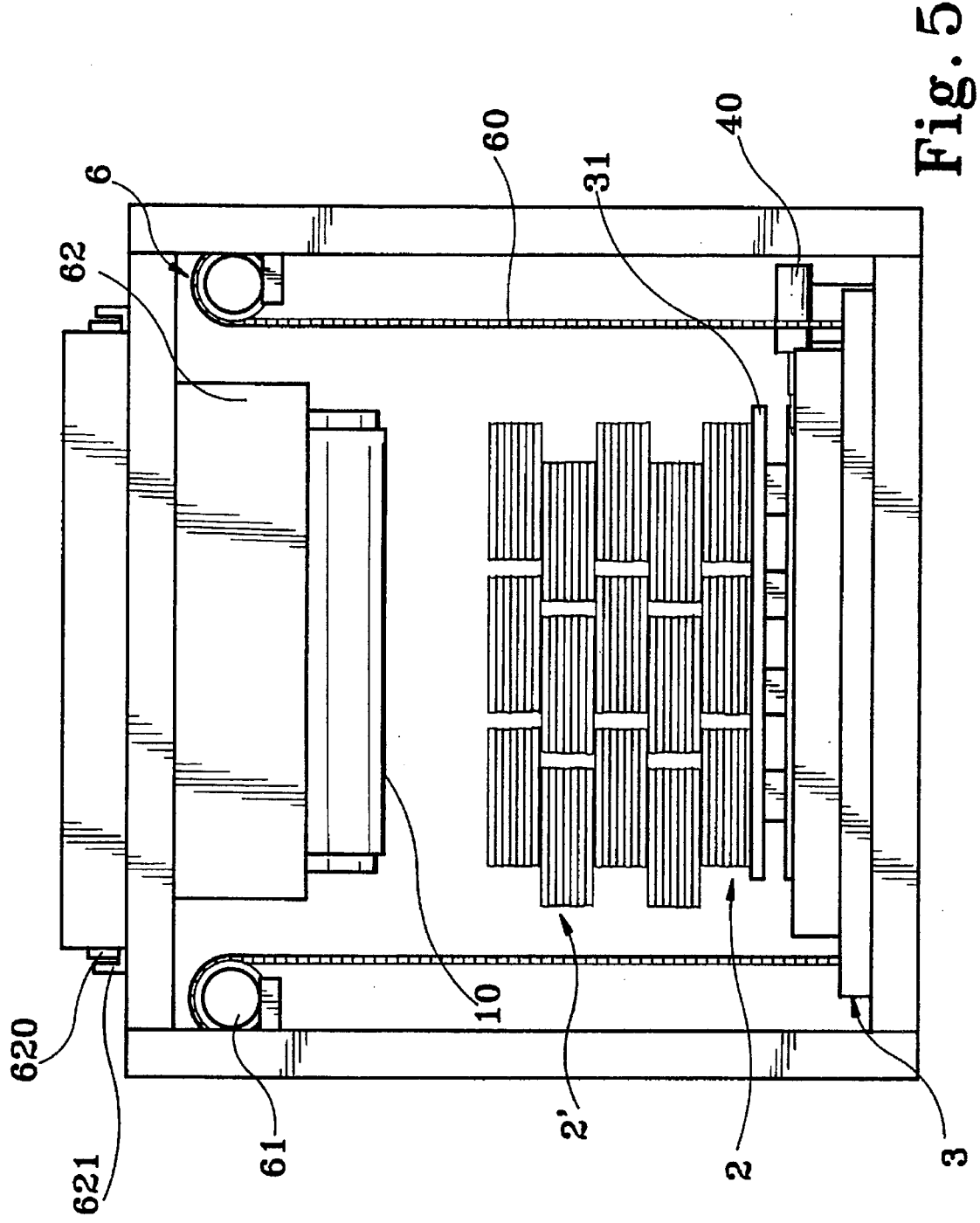

APPARATUS FOR STACKING CORRUGATED BOARDS

BACKGROUND OF THE INVENTION

The invention relates to an apparatus for stacking corrugated boards, permitting stacks of corrugated boards to be alternatively arranged together with one above another in a zigzag order.

In an automatic corrugated board fabrication system, a corrugating medium is processed into a continuous sheet of corrugated board, then cut into corrugated boards of a fixed length, and then delivered to a stacking yard by a finished product conveyer. At the stacking yard, collected corrugated boards are stacked into stacks by an automatic stacker which is equipped with a counter for counting the number of pieces of the collected corrugated boards. Because corrugated boards are orderly stacked, they tend to fall from the pallet when they are delivered. In order to prevent stacked corrugated boards from falling, corrugated boards can be arranged into stacks that overlap one another in a zigzag order. However, because this stacking procedure is performed by labor, the labor cost is relatively increased.

SUMMARY OF THE INVENTION

The present invention overcomes the above problems. It is one object of the present invention to provide a method of stacking corrugated boards in stacks, permitting stacks of corrugated boards to be alternatively arranged together with one above another in a zigzag order. It is another object of the present invention to provide an apparatus for stacking corrugated boards in overlapped stacks in a zigzag order. It is still another object of the present invention to provide an apparatus for stacking corrugated boards in overlapped stacks in a zigzag order which automatically counts the number of pieces of the corrugated boards been stacked.

BRIEF DESCRIPTION OF THE DRAWINGS

FIG. 5 shows stacks of corrugated boards alternatively arranged together with one above another in a zigzag order.

DETAILED DESCRIPTION OF THE PREFERRED EMBODIMENT

Figure 1:
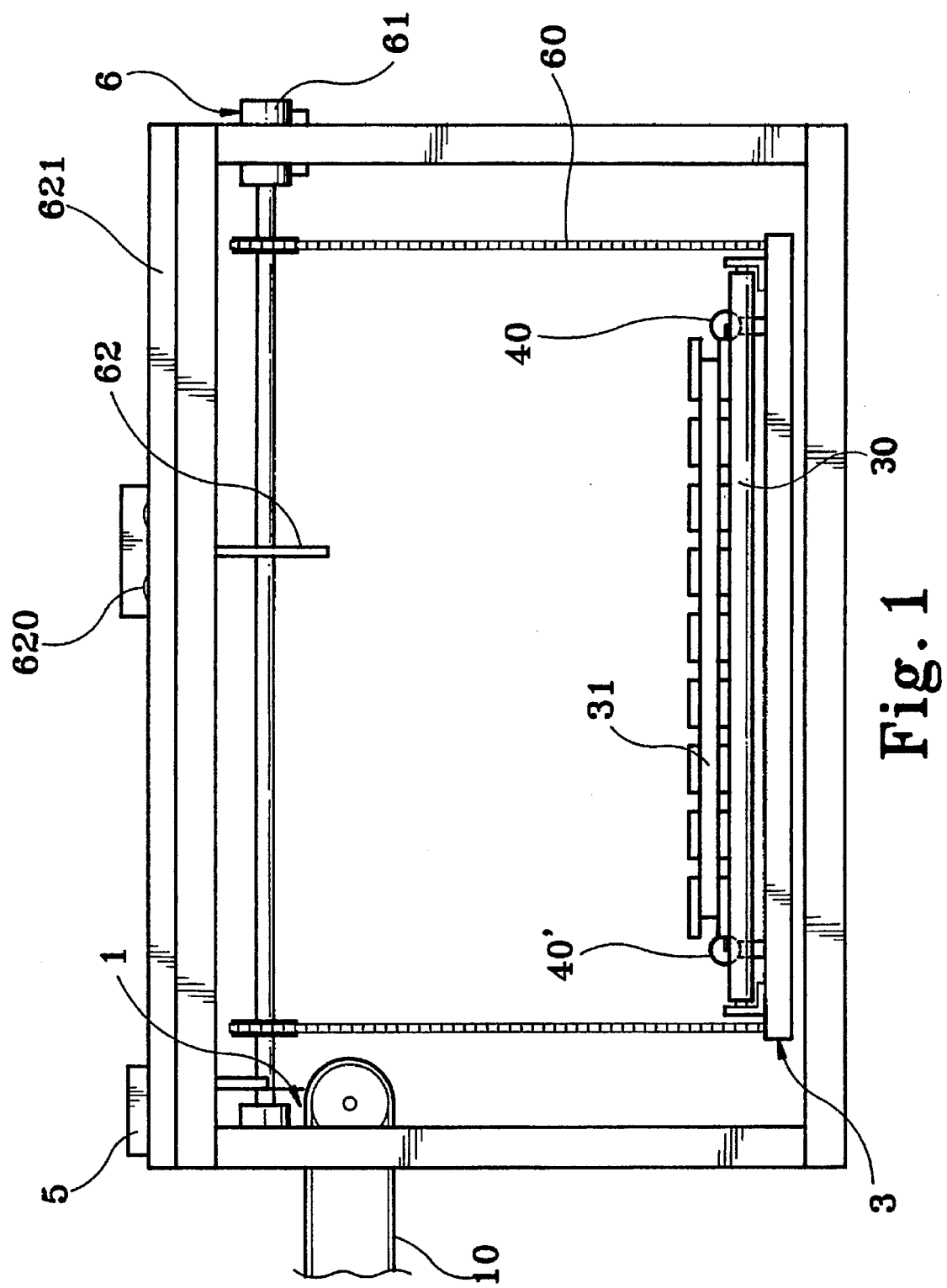
FIG. 1 shows an apparatus for stacking corrugated boards according to the present invention.
Figure 2:
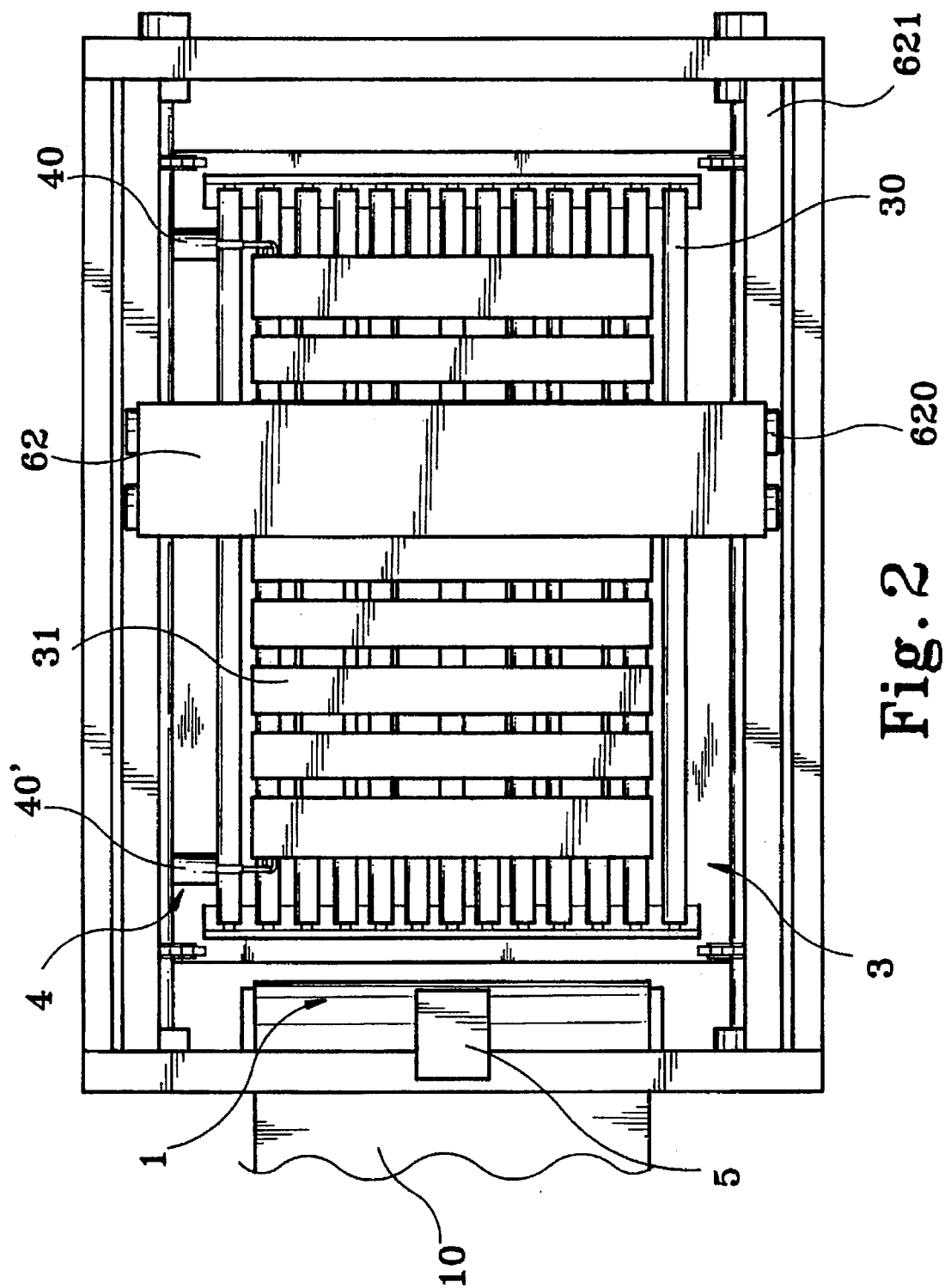
FIG. 2 is a top view of the apparatus shown in FIG. 1.

Referring to FIGS. 1 and 2, an apparatus for stacking corrugated boards in accordance with the present invention is generally comprised of a carrier 3 disposed adjacent to the output end 1 of the finished product conveyer 10 of an automatic corrugated board fabrication system at an elevation lower than the output end 1 of the finished product conveyer 10 for carrying corrugated boards 2 falling from the output end 1 of the finished product conveyer 10, a shifting mechanism 4 controlled to shift the pallet 31 of the carrier 3 horizontally, a counter 5 controlled to count the number of pieces of the corrugated boards 2 being accumulated on the carrier 3, and a suspension mechanism 6 controlled to lift or lower the carrier 3.

The aforesaid carrier 3 comprises a track defined by a plurality of rollers 30 longitudinally disposed in a parallel relation, a pallet 31 supported on the rollers 30 and moved transversely by them for receiving and carrying corrugated boards 2 delivered from the output end 1 of the finished product conveyer 10.

Figure 3:
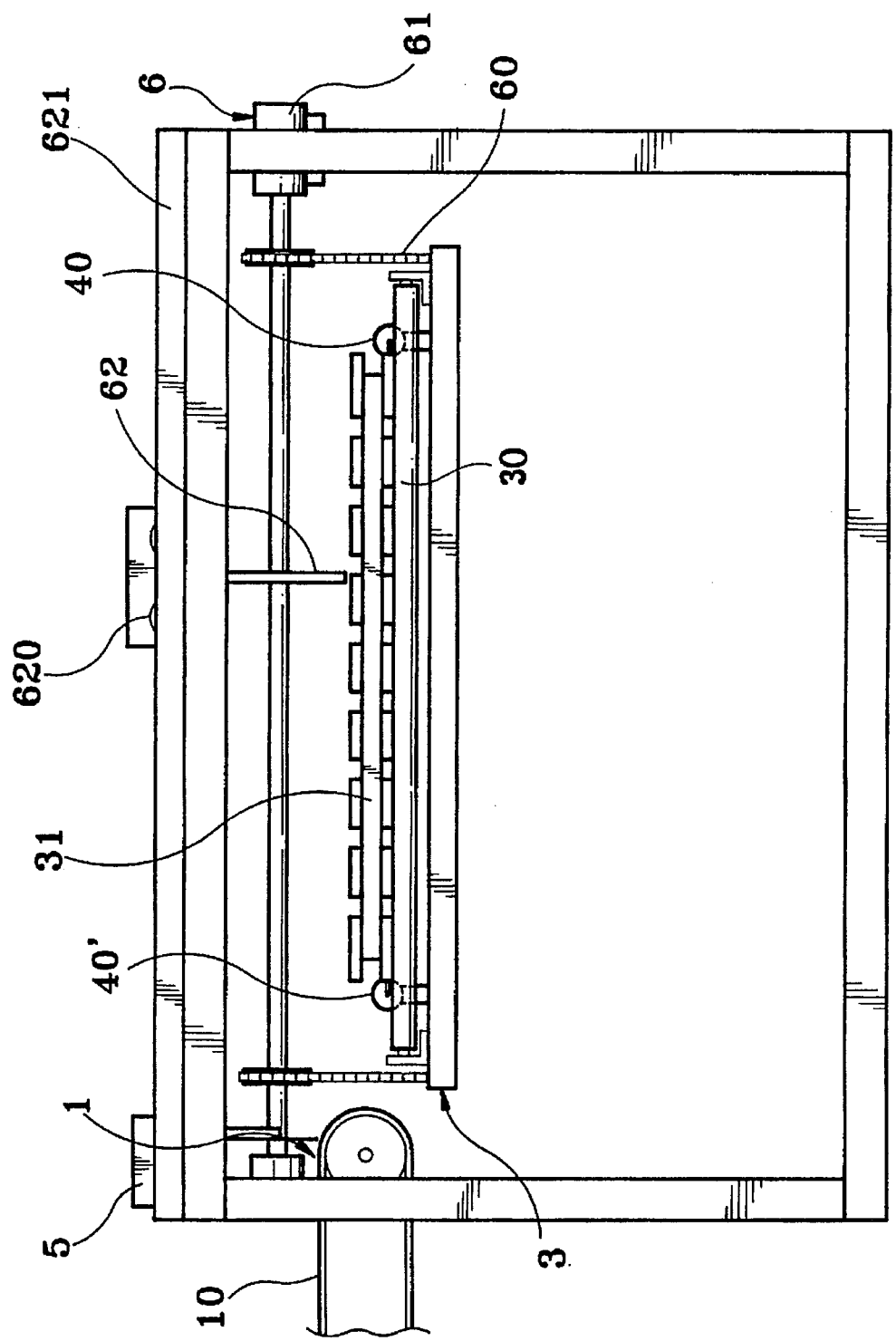
FIG. 3 is similar to FIG. 1 but showing the carrier lifted to the upper limit position.

The aforesaid suspension mechanism 6 comprises a plurality of links 60 (for example, cables or chains) symmetrically connected to two opposite sides of the carrier 3, and a driving mechanism 61 (for example, a motor or a hydraulic mechanism) controlled to take up or let off the links 60 so as to lift or lower the carrier 3. At the initial stage, as illustrated in FIG. 3, the carrier 3 is lifted to the upper limit position slightly below the elevation of the output end 1 of the finished product conveyer 10 for receiving corrugated boards 2 from the finished product conveyer 10. When a first corrugated board 2 is delivered out of the output end 1 of the finished product conveyer 10, it automatically falls to the pallet 31 of the carrier 3 and stopped in place by a stopper 62, which is suspended from the top side of the suspension mechanism 6. When a second corrugated board 2 is delivered out of the output end 1 of the finished product conveyer 10, it automatically falls to the top of the first corrugated board 2 on the pallet 31 of the carrier 3. Therefore, when a plurality of corrugated boards 2 are delivered to the pallet 31 of the carrier 3, they are automatically arranged in a stack. If the finished product conveyer 10 is designed to deliver two or more corrugated boards 2 in a parallel relation, collected corrugated boards 2 will be automatically gathered at the pallet 31 in two or more stacks.

The aforesaid counter 5 can be a mechanism counting apparatus or an electronic counting apparatus which counts the number of corrugated boards passing out of the output end 1 of the finished product conveyer 10. When one corrugated board 2 is delivered out of the output end 1 of the finished product conveyer 10, the reading of the counter 5 is added by one, and at the same time the suspension mechanism 6 is controlled by the counter 5 to lower the carrier 3 at a distance not shorter than the thickness of one corrugated board 2. Therefore, the pallet 31 of the carrier 3 is automatically moved to the fitted position for receiving a next corrugated board 2, and permitting the incoming corrugated board 2 to be accurately stacked in place.

Figure 4:
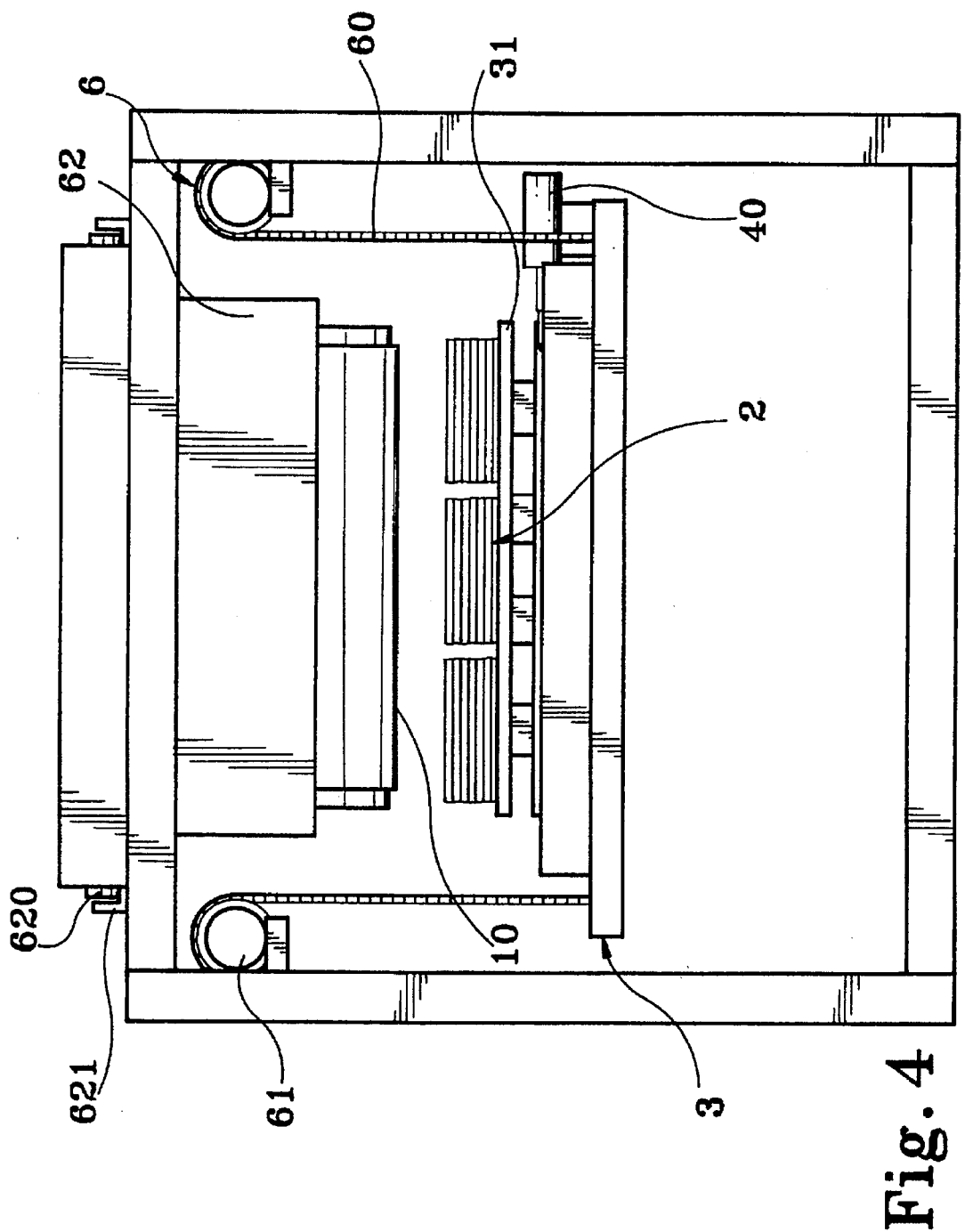
FIG. 4 shows the stack of the carrier shifted, and corrugated boards stacked on the stack of the carrier at different locations.

When the number of stacked corrugated boards 2 reaches the set value of the counter 5 (the set value can be adjusted as desired), the counter 5 immediately turns on the hydraulic cylinders 40 and 40' of the shifting mechanism 4, causing it to shift the pallet 31 horizontally from the existing position to a second position, for permitting further incoming corrugated boards 2 to be delivered to such a second position (see FIG. 4). When shifting the pallet 31 of the carrier 3 horizontally, the delivery of further incoming corrugated boards 2 must be delayed. When a predetermined number of corrugated boards 2 are collected and arranged in a stack, the pallet 31 of the carrier 3 is then shifted horizontally to another position for permitting different stacks of collected corrugated boards 2 and 2' to be alternatively arranged one above another in a zigzag order (see FIG. 5).

When the total number of stacked corrugated boards 2 reaches the predetermined value, the carrier 3 is lowered to the lower limit position, the finished product conveyer 10 is stopped, and then the pallet 31 with the stacked corrugated boards 2 and 2' can be carried away by a truck to the warehouse for stocking.

The aforesaid stopper 62 is coupled to a slide 620 and moved along a track 621, which is suspended above the carrier 3.

While only one embodiment of the present invention has been shown and described, it will be understood that various modifications and changes may be made without departing from the spirit and scope of the disclosed invention. For example, the shifting mechanism 4 may be constructed similar to the structure of the suspension mechanism 6 (comprised of a plurality of links and a driving mechanism), instead of the aforesaid hydraulic cylinder 40.

I claim:

1. An apparatus for collecting corrugated boards from the output end of a finished product conveyer of an automatic corrugated board fabrication system and stacking the boards in a zig-zag configuration, which apparatus comprises:

a) a carrier for receiving finished corrugated boards from the output end of a product conveyer;

b) a shifting mechanism including a hydraulic cylinder means for shifting the carrier horizontally between at least two different positions for permitting corrugated boards received from the conveyer to be collected in different stacks on the carrier; and c) a counter for counting the number of corrugated boards collected on the conveyor, deactivating the conveyor when a predetermined number of boards have been collected, and activating the shifting mechanism to shift the carrier from one position to another wherein said carrier comprises a plurality of rollers and a pallet moved on said rollers, and wherein said pallet is moved on said rollers by said shifting mechanism.

* * * * *